United States Patent
Park et al.

(10) Patent No.: US 10,553,363 B2
(45) Date of Patent: Feb. 4, 2020

(54) MULTILAYER CERAMIC CAPACITOR HAVING VIA ELECTRODE AND METHOD OF MANUFACTURING THE SAME

(71) Applicant: SAMSUNG ELECTRO-MECHANICS CO., LTD., Suwon-si, Gyeonggi-do (KR)

(72) Inventors: Ji Hyun Park, Suwon-si (KR); Jong Bong Lim, Suwon-si (KR); Hai Joon Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 55 days.

(21) Appl. No.: 15/293,944

(22) Filed: Oct. 14, 2016

(65) Prior Publication Data

US 2017/0278637 A1    Sep. 28, 2017

(30) Foreign Application Priority Data

Mar. 22, 2016    (KR) .................. 10-2016-0034146

(51) Int. Cl.
*H01G 4/30* (2006.01)
*H01G 4/236* (2006.01)
(Continued)

(52) U.S. Cl.
CPC ............. *H01G 4/306* (2013.01); *H01G 4/01* (2013.01); *H01G 4/236* (2013.01); *H01G 4/12* (2013.01)

(58) Field of Classification Search
CPC ........... H01G 4/306; H01G 4/01; H01G 4/12; H01G 4/236
See application file for complete search history.

(56) References Cited

U.S. PATENT DOCUMENTS 6,344,961 B1 *  2/2002  Naito .................... H01G 4/232
                                                            257/E23.067
6,407,907 B1 *  6/2002  Ahiko ................... H01G 4/232
                                                            257/E23.173
(Continued)

FOREIGN PATENT DOCUMENTS

JP    2000-514243 A    10/2000
JP    2007-512688 A     5/2007
(Continued)

OTHER PUBLICATIONS

Notice of Office Action dated Oct. 17, 2017, in corresponding Korean Patent Application No. 10-2016-0034146, with English language translation.
(Continued)

*Primary Examiner* — David M Sinclair
(74) *Attorney, Agent, or Firm* — Morgan, Lewis & Bockius LLP (57) ABSTRACT

A multilayer ceramic capacitor (MLCC) includes: a ceramic body having a plurality of dielectric layers, first internal electrodes, and second internal electrodes; and a first external electrode and a second external electrode, disposed on an exterior of the ceramic body. A plurality of via electrodes are disposed in the ceramic body; a first via electrode connects the first internal electrodes to the first external electrode; a second via electrode connects the second internal electrodes to the second external electrode; and the plurality of via electrodes have a stepped shape, and a distance in a length direction from a first vertical edge of each step to a second vertical edge of each step in the plurality of via electrodes is increased in a direction from the substrate toward an upper portion of the ceramic body.

8 Claims, 6 Drawing Sheets

(51) Int. Cl.
*H01G 4/12* (2006.01)
*H01G 4/01* (2006.01)

(56) References Cited

U.S. PATENT DOCUMENTS

| | | | | |
|---|---|---|---|---|
| 8,605,410 | B2* | 12/2013 | Oikawa | H01G 4/005 29/25.03 |
| 2007/0176175 | A1* | 8/2007 | Shioga | H01G 4/228 257/40 |
| 2008/0186654 | A1* | 8/2008 | Takeshima | H01G 4/232 361/313 |
| 2010/0252527 | A1* | 10/2010 | Takeshima | H01G 4/228 216/13 |
| 2013/0043509 | A1* | 2/2013 | Cho | H01L 27/11526 257/208 |
| 2013/0051126 | A1* | 2/2013 | Kwong | H01G 4/30 365/149 |

FOREIGN PATENT DOCUMENTS

| | | | | |
|---|---|---|---|---|
| JP | 2008243931 A | * | 10/2008 | |
| JP | 2008252011 A | * | 10/2008 | |
| JP | 2009-267376 A | | 11/2009 | |
| JP | WO 2016158228 A1 | * | 10/2016 | ............. H01G 4/33 |
| KR | 10-2007-0013572 A | | 1/2007 | |
| WO | 1998/000871 A1 | | 1/1998 | |
| WO | 2005/053026 A1 | | 6/2005 | |
| WO | 2007/010681 A1 | | 1/2007 | |

OTHER PUBLICATIONS

Notice of Office Action dated Apr. 12, 2017, in corresponding Korean Patent Application No. 10-2016-00341145, with English language translation.

\* cited by examiner

MULTILAYER CERAMIC CAPACITOR HAVING VIA ELECTRODE AND METHOD OF MANUFACTURING THE SAME

CROSS-REFERENCE TO RELATED APPLICATION

This application claims the benefit of priority to Korean Patent Application No. 10-2016-0034146, filed on Mar. 22, 2016 with the Korean Intellectual Property Office, the entirety of which is incorporated herein by reference.

TECHNICAL FIELD

The present disclosure relates to a multilayer ceramic capacitor (MLCC) and a method of manufacturing the same.

BACKGROUND

MLCCs, electronic components including multilayer chips, are chip-type condensers mounted on the printed circuit boards of various electronic products, such as image display devices, computers, personal digital assistants (PDAs), mobile phones, and the like, provided with display devices such as liquid crystal displays (LCDs), plasma display panels (PDPs), or the like, allowing electricity to be charged therein or discharged therefrom.

Since MLCCs have advantages including a small size, high capacitance, and ease of mountability, MLCCs may be used as components in various electronic devices.

Recently, as MLCCs have been used in smartphones, wearable devices, and the like, MLCCs have been increasingly miniaturized.

In order to maintain the level of capacitance of the miniaturized MLCCs at the same level as that of larger MLCCs, a larger number of laminated layers or a thinner dielectric layer should be implemented.

Furthermore, in the case of capacitor products manufactured using a thin film method, a method of forming a via electrode to connect an external electrode to an internal electrode and connect internal electrodes to each other is significant. The method of forming the via electrode and the final structure thereof affect the performance of the MLCC.

Prior art methods of manufacturing thin-film MLCCs include a method in which dielectric layers and electrode layers are alternately stacked, and when a via electrode is formed, a single via electrode requires two electrodes. In addition, through this method, the same number of via electrodes as electrode layers may be formed.

Subsequently, a method of patterning, when electrode layers are stacked, may allow even-numbered electrode layers and odd-numbered electrode layers to have different shapes to be stacked, and may allow only even-numbered electrode layers or odd-numbered electrode layers to be exposed when a single surface is etched, and thus an electrode may be connected.

However, since the methods described above require complex processes, and increased manufacturing costs, technologies for facilitating the manufacturing of miniaturized thin-film MLCCs have been demanded.

SUMMARY

An aspect of the present disclosure provides a miniaturized thin-film multilayer ceramic capacitor (MLCC) having high reliability and a method of manufacturing the same.

According to an aspect of the present disclosure, an MLCC includes a ceramic body having a plurality of dielectric layers, first internal electrodes, and second internal electrodes, alternately disposed on a substrate, and includes a first external electrode and a second external electrode, disposed on an exterior of the ceramic body. In addition, a plurality of via electrodes are disposed in the ceramic body. A first via electrode of the plurality of via electrodes connects the first internal electrode to the first external electrode, and penetrates through the ceramic body from the surface thereof to the first internal electrode disposed most adjacently to the substrate. Furthermore, a second via electrode of the plurality of via electrodes connects the second internal electrode to the second external electrode, and penetrates through the ceramic body from the surface thereof to the second internal electrode disposed most adjacently to the substrate. The plurality of via electrodes have a stepped shape, and a distance in a length direction from a first vertical edge of each step to a second vertical edge of each step therein is increased in a direction from the substrate toward an upper portion of the ceramic body.

According to another aspect of the present disclosure, a method of manufacturing an MLCC includes providing, on a substrate, a laminate including a dielectric layer, a first internal electrode, and a second internal electrode, where the first and second internal electrodes are alternately stacked with at least one dielectric layer being interposed therebetween; forming a via electrode by coating a photoresist on a top surface of the laminate and patterning the photoresist, and then etching the laminate to expose one of the first and second internal electrodes; and forming a plurality of via electrodes by repeating the etching process to another of the first and second internal electrodes after removing the patterned photoresist, and then coating a top surface of the laminate to a bottom surface of the via electrode with the photoresist, and then patterning the photoresist, where each via electrode is formed such that a lower portion of the via electrode has a width narrower than the width of an upper portion of the via electrode, disposed adjacently to the lower portion. The plurality of via electrodes have a stepped shape, and a distance in a length direction from a first vertical edge of each step to a second vertical edge of each step in the plurality of via electrodes is increased in a direction from the substrate toward an upper portion of a ceramic body.

According to another aspect of the present disclosure, A multilayer ceramic capacitor (MLCC) includes a ceramic body having a plurality of dielectric layers, a plurality of first internal electrodes, and a plurality of second internal electrodes, the plurality of first internal electrodes and the plurality of second internal electrodes being alternately disposed with at least one among the plurality of dielectric layers being interposed therebetween on a substrate; and a first external electrode and a second external electrode, disposed on an exterior of the ceramic body. A plurality of via electrodes are disposed in the ceramic body; a first via electrode among the plurality of via electrodes connects the plurality of first internal electrodes to the first external electrode, and penetrates through the ceramic body from a surface of the ceramic body to the first internal electrode among the plurality of first internal electrodes disposed most adjacently to the substrate; a second via electrode among the plurality of via electrodes connects the plurality of second internal electrodes to the second external electrode, and penetrates through the ceramic body from the surface of the ceramic body to the second internal electrode among the plurality of second internal electrodes disposed most adjacently to the substrate; and a top surface of at least one among the plurality of first internal electrodes is exposed to the first via electrode, and a top surface of at least one among the plurality of second internal electrodes is exposed to the second via electrode.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 1:
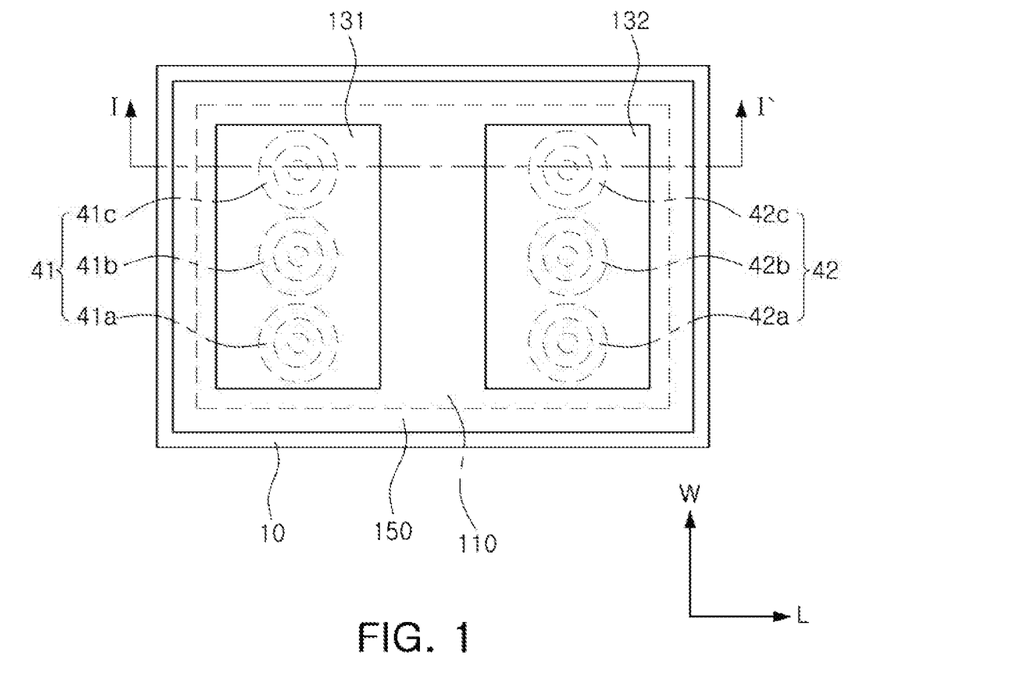
FIG. 1 is a plan view of a multilayer ceramic capacitor (MLCC) according to an exemplary embodiment.

FIG. 1 is a plan view of a multilayer ceramic capacitor (MLCC) according to an exemplary embodiment.

Figure 2:
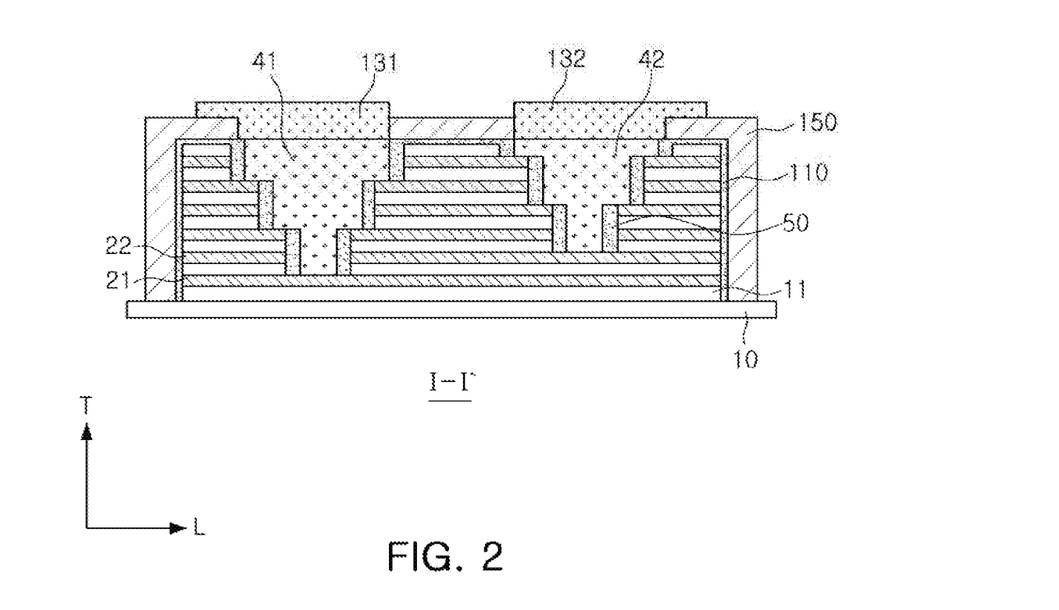
FIG. 2 is a cross-sectional view taken along line I-I' of FIG. 1.

FIG. 2 is a cross-sectional view taken along line I-I' of FIG. 1.

With reference to FIGS. 1 and 2, the MLCC according to the present exemplary embodiment includes a ceramic body 110 including a plurality of dielectric layers 11, first internal electrodes 21 and second internal electrodes 22, the first and second internal electrodes 21 and 22 being alternately disposed with at least one among the plurality of dielectric layers 11 being interposed therebetween, on a substrate 10, and includes a first external electrode 131 and a second external electrode 132, disposed on an exterior of the ceramic body 110.

The first internal electrodes 21 include the first internal electrode 21 disposed most adjacently to the substrate 10, and the second internal electrodes 22 include the second internal electrode 22 disposed most adjacently to the substrate 10. In addition, a plurality of via electrodes 41 and 42 are disposed in the ceramic body 110.

The plurality of via electrodes 41 and 42 may include a plurality of first via electrodes 41 and a plurality of second via electrodes 42. In addition, as shown in FIG. 1, the plurality of first via electrodes 41 may include first via electrodes 41a, 41b, and 41c, while the plurality of second via electrodes 42 may include second via electrodes 42a, 42b, and 42c. However, the present disclosure is not limited thereto, and more via electrodes may be formed.

According to an exemplary embodiment, a 'length direction' of the MLCC may be defined as an 'L' direction, and a 'width' direction may be defined as a 'W' direction in FIG. 1, and a 'thickness direction' may be defined as a 'T' direction in FIG. 2. The 'thickness direction' may refer to a direction in which the dielectric layers and the internal electrodes are stacked. In other words, the 'thickness direction' may be the same as the 'stacking direction'.

The ceramic body 110 has no specific limitations on a shape thereof, but in general, may have a hexahedral shape.

In addition, the ceramic body 110 has no specific limitations in a size thereof, but may have a size of 0.6 mm×0.3 mm, for example. The ceramic body 110 may be provided as a high capacitance MLCC having a capacitance of 1.0 uF or more.

According to an exemplary embodiment, a material forming the dielectric layer 11 may be provided as barium titanate (BaTiO$_3$) powder, but is not limited thereto. In addition, a ceramic additive, an organic solvent, a plasticizer, a bonding agent, a dispersing agent, and the like, may be added thereto.

A material forming the first internal electrode 21 and the second internal electrode 22 may be formed using a conductive paste including one or more materials among copper (Cu), nickel (Ni), silver (Ag), and silver-palladium (Ag—Pd), but is not limited thereto.

The first external electrode 131 and the second external electrode 132 may be formed on a top surface of the ceramic body 110, and may be electrically connected to the first internal electrode 21 and the second internal electrode 22 through the plurality of via electrodes 41 and 42 exposed on a surface of the ceramic body 110.

The first external electrode 131 and the second external electrode 132 may be formed in such a manner that the conductive paste is coated on the top surface of the ceramic body 110. In addition, components of the conductive paste may include a metal, such as Cu, glass, an organic material, and the like. Alternatively, the first external electrode 131 and the second external electrode 132 may be formed using a printing method or a sputtering method.

The ceramic body 110 may be formed in such a manner that the dielectric layer 11, the first internal electrode 21, and the second internal electrode 22 are alternately stacked on the substrate 10.

In more detail, the ceramic body 110 may be formed in a manner such as that illustrated in FIG. 2, where the plurality of dielectric layers 11 are stacked in a thickness direction, and the first internal electrode 21 and the second internal electrode 22 are alternately stacked to oppose each other with at least one among the plurality of dielectric layers 11 disposed therebetween.

In an exemplary embodiment, an etching process is performed to form each step in a via electrode having different areas in order to selectively connect internal electrodes in the MLCC, so that the via electrode may be formed to have a stepped shape, that is, a staircase shape.

In addition, among the internal electrodes exposed to the via electrode etched to have the staircase shape, certain internal electrodes should be insulated so that they are electrically isolated from the via electrode. Therefore, an insulating layer may be formed to insulate these internal electrodes from the via electrode.

Subsequently, an electrode connection layer may be formed in such a manner that only the internal electrodes desired to connect to the via electrode are exposed, a seed layer is formed using an electroless plating method or a sputtering method, and a conductive metal is filled through plating.

Using the method described above, internal electrodes indifferent layers may be electrically connected using a single via electrode.

According to an exemplary embodiment, since the MLCC is manufactured in such a manner that the dielectric layer 11, the first internal electrode 21, and the second internal electrode 22 are simultaneously stacked in a vacuum, damage that may occur due to being exposed outwardly of the MLCC may be significantly reduced.

According to an exemplary embodiment, a protective layer 150 may be disposed to protect the stacked multilayer structure on the exterior of the ceramic body 110 in which the dielectric layer 11, the first internal electrode 21, and the second internal electrode 22 are simultaneously stacked in a vacuum.

The first via electrode 41 of the plurality of via electrodes 41 and 42 connects the first internal electrode 21 to the first external electrode 131, and penetrates through the ceramic body 110 from a surface thereof to the first internal electrode 21 disposed most adjacently to the substrate 10.

In addition, the second via electrode 42 of the plurality of via electrodes 41 and 42 connects the second internal electrode 22 to the second external electrode 132, and penetrates through the ceramic body 110 from the surface thereof to the second internal electrode 22 disposed most adjacently to the substrate 10.

According to an exemplary embodiment, the plurality of via electrodes 41 and 42 have a staircase shape, or a stepped shape, where a width of each step in the plurality of via electrodes 41 and 42 is increased in a direction from the substrate 10 toward an upper portion of the ceramic body 110.

The first via electrode 41 and the second via electrode 42 are manufactured such that the width of each step therein is increased in the direction from the substrate 10 toward the upper portion of the ceramic body 110 as described above, so that the first via electrode 41 may be connected to an entirety of the first internal electrodes 21 disposed in the ceramic body 110, while the second via electrode 42 may be connected to an entirety of the second internal electrodes 22 disposed in the ceramic body 110 as described below.

In addition, the width of each step in the first via electrode 41 and the second via electrode 42 is increased in the direction from the substrate 10 toward the upper portion of the ceramic body 110. Therefore, in the case of the first internal electrode 21 exposed to the first via electrode 41 and the second internal electrode 22 exposed to the second via electrode 42, the insulating layer 50 may be disposed on an etched cutting surface, and a portion of a top surface of the first internal electrode 21 may be exposed to the first via electrode 41, and a portion of a top surface of the second internal electrode 22 maybe exposed to the second via electrode 42.

The first via electrode 41 allows the etching process to be repeated a plurality of times to a layer in which the first internal electrode 21 is exposed, and has the staircase shape, or the stepped shape, where the width of each step in the first via electrode 41 is increased in the direction from the substrate 10 toward the upper portion of the ceramic body 110. Therefore, after an insulating process, the insulating layer 50 is disposed on the etched cutting surface of the dielectric layer 11, the first internal electrode 21, and the second internal electrode 22, and only a portion of a top surface of the first internal electrode 21 may be exposed.

Thus, the entirety of the first internal electrodes 21 may be electrically connected to each other, and may be electrically connected to the first external electrode 131, through the first via electrode 41.

Furthermore, the second via electrode 42 allows the etching process to be repeated a plurality of times to a layer in which the second internal electrode 22 is exposed, and has the staircase shape, or the stepped shape, where the width of each step in the second via electrode 42 is increased in the direction from the substrate 10 toward the upper portion of the ceramic body 110. Therefore, after the insulating process, the insulating layer 50 is disposed on the etched cutting surface of the dielectric layer 11, the first internal electrode 21, and the second internal electrode 22, and only a portion of a top surface of the second internal electrode 22 may be exposed.

Thus, the entirety of the second internal electrodes 22 may be electrically connected to each other, and may be electrically connected to the second external electrode 132, through the second via electrode 42.

In addition, the insulating layer 50 may be disposed on the second internal electrode 22 exposed in the first via electrode 41 and on the first internal electrode 21 exposed in the second via electrode 42.

In detail, the insulating layer 50 may be disposed on the etched cutting surface of the second internal electrode 22 exposed in the first via electrode 41 and of the first internal electrode 21 exposed in the second via electrode 42.

According to an exemplary embodiment, the first via electrode 41 may be connected to the entirety of the first internal electrodes 21 disposed in the ceramic body 110, while the second via electrode 42 may be connected to the entirety of the second internal electrodes 22 disposed in the ceramic body 110.

In an exemplary embodiment, the first via electrode 41 is connected to the entirety of the first internal electrodes 21, and the second via electrode 42 is connected to the entirety of the second internal electrodes 22. Therefore, even in a case in which a single internal electrode or a plurality of internal electrodes are not connected to the via electrode due to process variation, the MLCC is still capable of forming a capacitance.

In other words, in the prior art, where a structure is used in which a single internal electrode is connected to a single via electrode, if the connection therebetween fails, capacitance is not formed, so the capacitance of the capacitor is reduced.

However, according to the present exemplary embodiment, the first via electrode 41 is connected to the entirety of the first internal electrodes 21, and the second via electrode 42 is connected to the entirety of the second internal electrodes 22. Therefore, even if a portion of the connection between the internal electrode and the via electrode fails, the MLCC is still capable of forming a capacitance, and thus high reliability may be secured.

The first via electrode 41 may be provided as a plurality of first via electrodes, and the plurality of first via electrodes 41 may have the same depths, while the second via electrode 42 may also be provided as a plurality of second via electrodes, and the plurality of second via electrodes 42 may also have the same depths.

In other words, the first via electrode 41 penetrates through the ceramic body 110 from the surface thereof to the first internal electrode 21 disposed most adjacently to the substrate 10, while the second via electrode 42 penetrates through the ceramic body 110 from the surface thereof to the second internal electrode 22 disposed most adjacently to the substrate 10. In addition, the plurality of first via electrodes have the same depths, while the plurality of second via electrodes also have the same depths.

Hereinafter, according to an exemplary embodiment, a description of manufacturing the MLCC will be provided, but the present disclosure is not limited thereto.

FIGS. 3A to 3J are views illustrating a method of forming a via electrode in an MLCC according to another exemplary embodiment.

Hereinafter, a description of a process of forming a via electrode in the MLCC, will be provided with reference to FIGS. 3A to 3J.

Figure 3A:
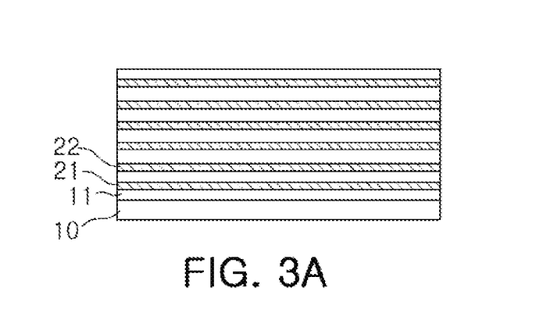
FIGS. 3A to 3J are views illustrating a method of forming a via electrode in an MLCC according to another exemplary embodiment.

With reference to FIG. 3A, a laminate may be provided in such a manner that a plurality of dielectric layers 11, a first internal electrode 21, and a second internal electrode 22 are provided on a substrate 10, where the first and second internal electrodes 21 and 22 are alternately stacked with at least one among the plurality of dielectric layers 11 interposed therebetween.

The substrate 10 has no specific limitations, and for example, may be provided as a prepreg.

The dielectric layer 11 is formed in such a manner that a ceramic material including powder, such as $BaTiO_3$, is deposited on the substrate 10 and dried, while the first internal electrode 21 is formed on the dielectric layer 11 in such a manner that a conductive metal is deposited using a screen printing method, or the like. In addition, on the first internal electrode 21, the dielectric layer 11 and the second internal electrode 22 are formed again.

As such, a plurality of first and second internal electrodes 21 and 22 may be formed to be alternately stacked to oppose each other with the dielectric layer 11 disposed therebetween.

The dielectric layer 11, the first internal electrode 21, and the second internal electrode 22 are stacked through deposition, but the present disclosure is not limited thereto. Furthermore, the dielectric layer 11, the first internal electrode 21, and the second internal electrode 22 may also be stacked through coating in a manner the same as a process of printing a paste pattern.

The dielectric layer 11, the first internal electrode 21, and the second internal electrode 22 are simultaneously stacked in a vacuum without a separate patterning process.

Figure 3B:
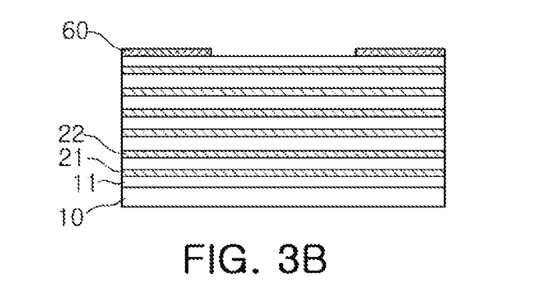

With reference to FIG. 3B, in order to allow electrodes on layers disposed in the laminate to be exposed, a photoresist 60 is coated on a top surface of the laminate, and the photoresist 60 is patterned through an exposure process and a development process.

Figure 3C:
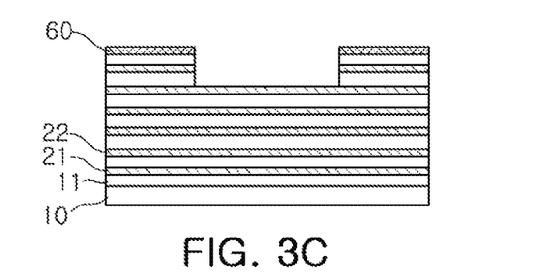

With reference to FIG. 3C, a via electrode is formed in such a manner that an etching process is performed to a predetermined internal electrode.

The via electrode illustrated in FIG. 3C is provided as a first via electrode. In addition, the via electrode is formed in such a manner that the etching process is performed to the first internal electrode disposed most adjacently to the top surface of the laminate to allow the first internal electrode to be exposed.

Figure 3D:
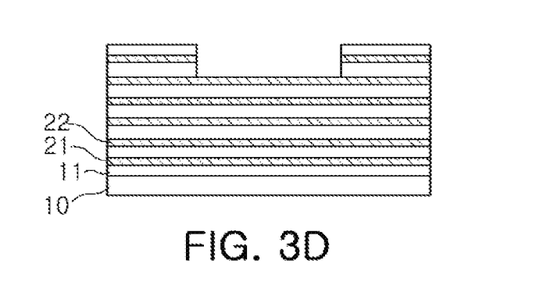

With reference to FIG. 3D, the patterned photoresist 60 is removed.

Figure 3E:
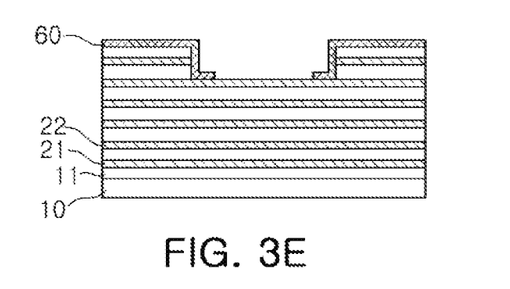

With reference to FIG. 3E, the photoresist 60 is coated from the top surface of the laminate to a bottom surface of the via electrode, that is, a top surface of the exposed first internal electrode, and the photoresist 60 is patterned through the exposure process and the development process.

The patterned photoresist 60 is patterned to have an exposed area smaller than that of the patterned photoresist 60 illustrated in FIG. 3B.

Figure 3F:
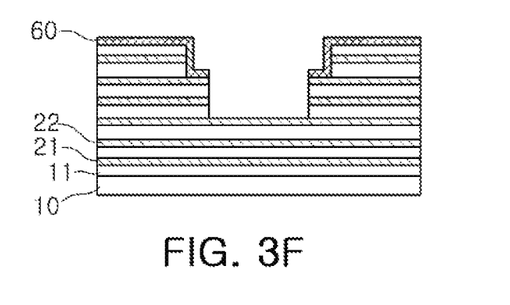

With reference to FIG. 3F, subsequently, the etching process is performed to the predetermined internal electrode, and a process of forming a via electrode is performed.

The via electrode illustrated in FIG. 3F is provided as a first via electrode. In addition, the via electrode is formed in such a manner that the etching process is performed to the first internal electrode for the via electrode to be connected to the first internal electrode in a direction from the top surface of the laminate toward the substrate so that the subsequent first internal electrode disposed below the first internal electrode disposed most adjacently to the top surface thereof may be exposed.

In the etching process, the dielectric layer and the second internal electrode, disposed between the first internal electrode disposed most adjacently to the top surface of laminate and the subsequent first internal electrode disposed therebelow are simultaneously exposed.

In other words, a layer etched through a single etching process includes two or more electrodes and a dielectric layer.

The via electrode is formed to have a width narrower than a via electrode formed in such a manner that the etching process is performed to allow the first internal electrode disposed most adjacently to the top surface of the laminate to be exposed.

According to an exemplary embodiment, a plurality of via electrodes are formed by performing the process repeatedly. Furthermore, each via electrode is formed to allow a lower portion thereof to have a width narrower than that of an upper portion disposed adjacently to the lower portion.

Figure 3G:
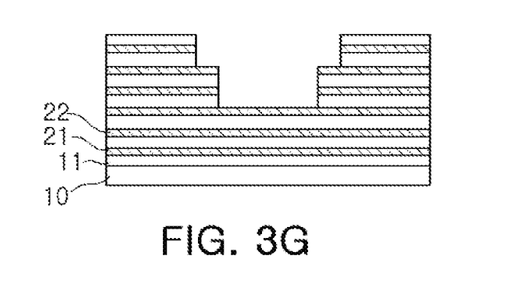

In detail, with reference to FIG. 3G, the patterned photoresist 60 is removed.

Figure 3H:
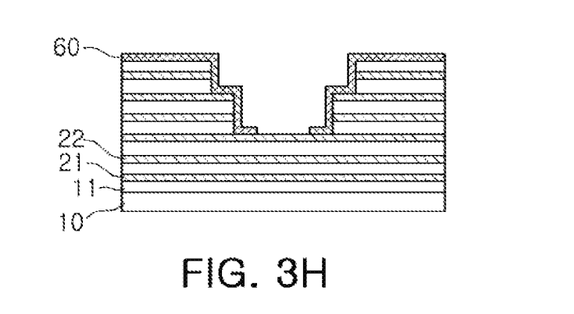

With reference to FIG. 3H, the photoresist 60 is coated from the top surface of the laminate to the bottom surface of the via electrode formed in FIG. 3F, that is, the top surface of the exposed first internal electrode, and the photoresist 60 is patterned through the exposure process and the development process.

The patterned photoresist 60 is patterned to have an exposed area smaller than that of the patterned photoresist 60 illustrated in FIG. 3E.

Figure 3I:
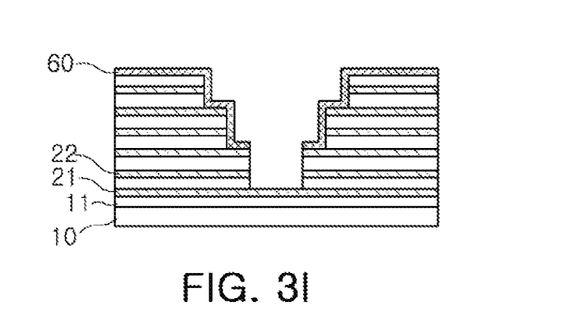

With reference to FIG. 3I, subsequently, the etching process is performed to the predetermined internal electrode, and the process of forming the via electrode is performed.

As illustrated in FIG. 3I, the via electrode is formed in such a manner that the etching process is performed to allow the first internal electrode disposed below the first internal electrode exposed in FIG. 3F to be exposed.

In the etching process, the dielectric layer and the second internal electrode, disposed between the first internal electrode exposed in FIG. 3F and the first internal electrode disposed therebelow are simultaneously exposed.

The via electrode is formed to have the width narrower than that of the via electrode formed in FIG. 3F.

Figure 3J:
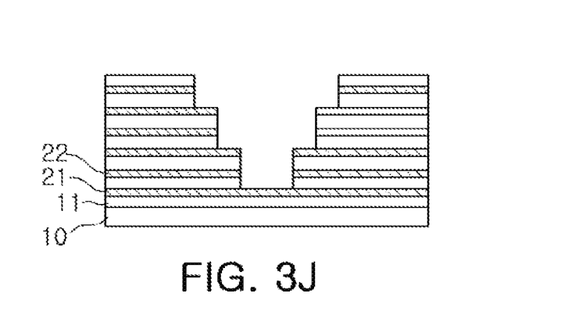

With reference to FIG. 3J, the patterned photoresist 60 is removed.

FIGS. 4A to 4D are views illustrating a method of forming an insulating layer in a via electrode in an MLCC according to another exemplary embodiment.

FIGS. 4A to 4D illustrate a process of patterning an insulting layer to selectively connect an exposed electrode.

In other words, a first via electrode is required to be connected to a first internal electrode, while an exposed second internal electrode is required to be insulated. In the meantime, a second via electrode is required to be connected to a second internal electrode, while an exposed first internal electrode is required to be insulated.

Therefore, the second internal electrode in the case of the first via electrode and the first internal electrode in the case of the second via electrode are required to be electrically isolated through a dielectric or an insulating layer.

Figure 4A:
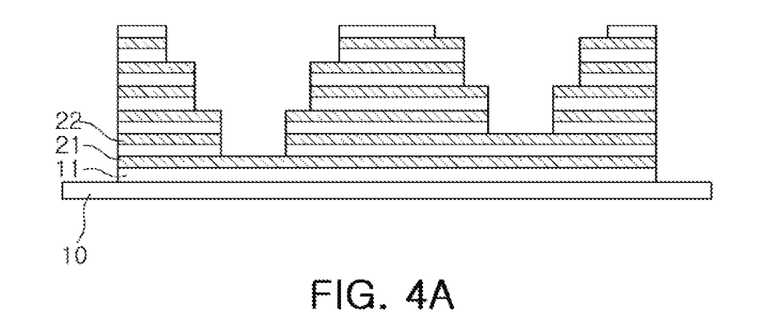
FIGS. 4A to 4D are views illustrating a method of forming an insulating layer in a via electrode in an MLCC according to another exemplary embodiment.

FIG. 4A illustrates a cross-sectional view of a laminate in which the first via electrode and the second via electrode are formed therein through the processes in FIGS. 3A to 3J.

The first via electrode penetrates through the laminate from a surface thereof to the first internal electrode disposed most adjacently to the substrate 10. In addition, the second via electrode penetrates through the laminate from the surface thereof to the second internal electrode disposed most adjacently to the substrate 10.

According to an exemplary embodiment, the first via electrode and the second via electrode have a staircase shape, or a stepped shape, where a distance in a length direction from a first vertical edge of each step to a second vertical edge of each step in the first via electrode and the second via electrode is increased in a direction from the substrate 10 toward an upper portion of the laminate.

As described above, the first via electrode and the second via electrode are manufactured such that the distance in a length direction from a first vertical edge of each step to a second vertical edge of each step therein is increased in the direction from the substrate 10 toward the upper portion of the laminate, so that the first via electrode may be connected to an entirety of the first internal electrodes, and the second via electrode may be connected to an entirety of the second internal electrodes.

Figure 4B:
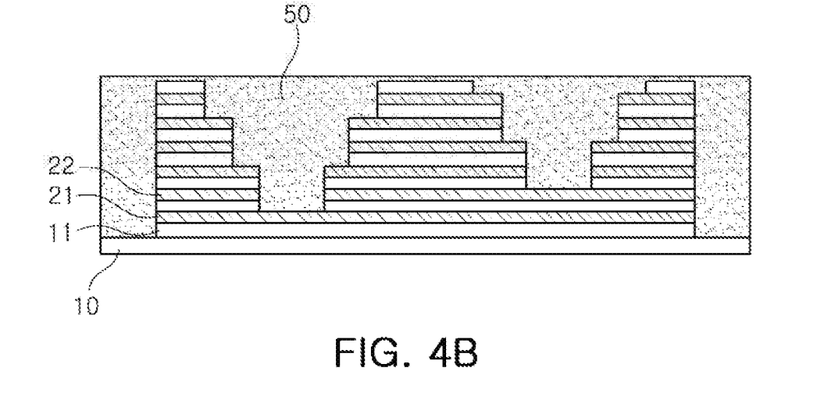

With reference to FIG. 4B, a plurality of via electrodes having the stepped shape are formed in the laminate, and an insulating material 50 is coated on a portion of the substrate 10 and an entirety of the laminate.

Figure 4C:
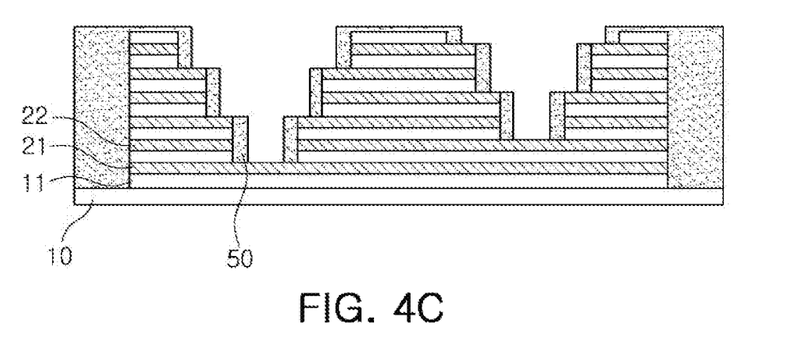

With reference to FIG. 4C, the insulating material 50 is etched, and thus an insulating layer 50 is formed in the plurality of via electrodes 41 and 42.

The insulating layer 50 is formed on an etched cutting surface of a dielectric layer 11, a first internal electrode 21, and a second internal electrode 22 in the plurality of via electrodes 41 and 42.

The distance in a length direction from a first vertical edge of each step to a second vertical edge of each step in the first via electrode and the second via electrode is increased in the direction from the substrate 10 toward the upper portion of the laminate. Therefore, in the case of the first internal electrode 21 exposed in the first via electrode 41 and the second internal electrode 22 exposed in the second via electrode 42, the insulating layer 50 may be disposed on an etched cutting surface, and a portion of a top surface may be exposed.

In addition, the first via electrode 41 allows an etching process to be repeated a plurality of times to a layer in which the first internal electrode 21 is exposed, and has the staircase shape, or the stepped shape, while the width of each step in the first via electrode 41 is increased in the direction from the substrate 10 toward the upper portion of the laminate. Therefore, after an insulation process, the insulating layer 50 is disposed on the etched cutting surface of the dielectric layer 11, the first internal electrode 21, and the second internal electrode 22, and only a portion of a top surface of the first internal electrode 21 may be exposed.

Thus, an entirety of the first internal electrodes 21 may be electrically connected to each other, and may be electrically connected to a first external electrode 131, through the first via electrode 41.

Furthermore, the second via electrode 42 allows the etching process to be repeated a plurality of times to a layer in which the second internal electrode 22 is exposed, and has the staircase shape, or the stepped shape, while the width of each step in the second via electrode 42 is increased in the direction from the substrate 10 toward the upper portion of the laminate. Therefore, after the insulation process, the insulating layer 50 is disposed on the etched cutting surface of the dielectric layer 11, the first internal electrode 21, and the second internal electrode 22, and only a portion of a top surface of the second internal electrode 22 may be exposed.

Thus, an entirety of the second internal electrodes 22 may be electrically connected to each other, and may be electrically connected to a second external electrode 132, through the second via electrode 42.

According to an exemplary embodiment, the first via electrode 41 may be connected to the entirety of the first internal electrodes 21 disposed in the laminate, while the second via electrode 42 may be connected to the entirety of the second internal electrodes 22 disposed in the laminate.

In an exemplary embodiment, the first via electrode 41 is connected to the entirety of the first internal electrodes 21, and the second via electrode 42 is connected to the entirety of the second internal electrodes 22. Therefore, even in a case in which a single internal electrode or a plurality of internal electrodes are not connected to the via electrode due to process variation, there is no problem in forming capacitance.

In other words, the first via electrode 41 is connected to the entirety of the first internal electrodes 21, and the second via electrode 42 is connected to the entirety of the second internal electrodes 22. Therefore, since even if a portion of the connection between the internal electrode and the via electrode fails, there is no problem in forming capacitance, and thus high reliability may be secured.

The first via electrode 41 is provided as a plurality of first via electrodes, and the plurality of the first via electrodes 41 have the same depths, while the second via electrode 42 is also provided as a plurality of second via electrodes, and the plurality of the second via electrodes 42 have the same depths.

In other words, the first via electrode 41 penetrates through the ceramic body 110 from a surface thereof to the first internal electrode 21 disposed most adjacently to the substrate 10, while the second via electrode 42 penetrates through the ceramic body 110 from the surface thereof to the second internal electrode 22 disposed most adjacently to the substrate 10. In addition, the plurality of the first via electrodes have the same depths, while the plurality of the second via electrodes also have the same depths.

Figure 4D:
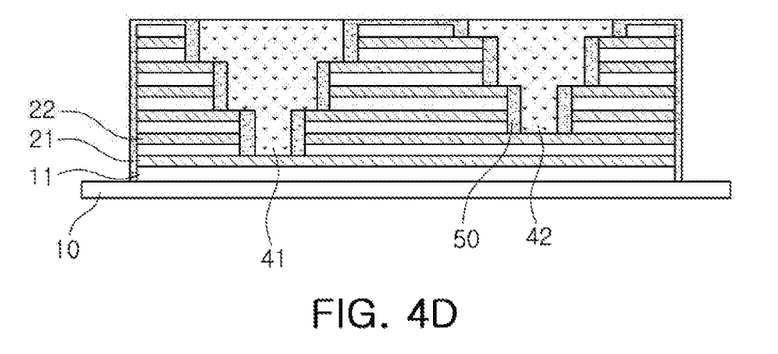

With reference to FIG. 4D, the first via electrode 41 and the second via electrode 42 are filled with a conductive metal.

A process of filling the first via electrode 41 and the second via electrode 42 with the conductive metal is performed in such a manner that a seed layer is formed on a surface of each exposed internal electrode, and the conductive metal is filled using a plating process to allow the internal electrode to be connected to an external electrode.

As set forth above, according to exemplary embodiments, damage caused by external environment may be significantly reduced during thin film deposition, and a miniaturized product having a relatively low thickness may be produced, as an MLCC may allow a dielectric and an electrode to be simultaneously stacked to be electrically connected through a via electrode having the stepped shape.

In addition, since each of an entirety of layer requiring being electrically connected is connected to each other using a single via electrode, thus increasing capacitance in such a manner that a decrease in area is significantly reduced due to the via electrode.

Furthermore, since the number of laminated layers of a thin-film MLCC may be increased in such a manner that a product structure is simplified through patterning an insulating layer in the via electrode, the high capacitance MLCC may be manufactured.

In addition, the thin-film MLCC according to an exemplary embodiment may include a low equivalent series inductance (ESL) and a low equivalent series resistance (ESR).

While exemplary embodiments have been shown and described above, it will be apparent to those skilled in the art that modifications and variations could be made without departing from the scope of the present invention as defined by the appended claims.

What is claimed is:

1. A multilayer ceramic capacitor (MLCC), comprising:
a ceramic body having a plurality of dielectric layers, first internal electrodes, and second internal electrodes, the first and second internal electrodes being alternately disposed with at least one among the plurality of dielectric layers being interposed therebetween on a substrate;
an outer insulating layer including a side portion disposed on a side surface of the ceramic body to cover each of the first internal electrodes and each of the second internal electrodes, and an upper portion connecting the side portion and an uppermost one of the inner insulating layers to each other;
a protective layer covering the side portion of the outer insulating layer and at least a portion of the upper portion of the outer insulating layer; and
a first external electrode and a second external electrode, disposed on an exterior of the ceramic body,
wherein a plurality of via electrodes are disposed in the ceramic body,
a first via electrode among the plurality of via electrodes connects the first internal electrodes to the first external electrode, and penetrates through the ceramic body from a surface of the ceramic body to the first internal electrode disposed most adjacently to the substrate,
a second via electrode among the plurality of via electrodes connects the second internal electrodes to the second external electrode, and penetrates through the ceramic body from the surface of the ceramic body to the second internal electrode disposed most adjacently to the substrate,
the plurality of via electrodes have a stepped shape, and a distance in a length direction from a first vertical edge of each step to a second vertical edge of each step in the plurality of via electrodes is increased in a direction from the substrate toward an upper portion of the ceramic body,
inner insulating layers respectively cover all side surfaces of the plurality of via electrodes,
at least one of the inner insulating layers is in direct contact with a side surface of one of the first internal electrodes and one of the second internal electrodes adjacent to the one of the first internal electrodes, and
the stepped shape of the plurality of via electrodes defines a shape of stacked cylinders, and, for each of the plurality of via electrodes, the respective stacked cylinders have the same center.

2. The MLCC of claim 1, wherein the first via electrode is connected to an entirety of the first internal electrodes disposed in the ceramic body.

3. The MLCC of claim 1, wherein the second via electrode is connected to an entirety of the second internal electrodes disposed in the ceramic body.

4. The MLCC of claim 1, wherein the first via electrode is provided as a plurality of first via electrodes, and the plurality of first via electrodes have the same depths.

5. The MLCC of claim 1, wherein the second via electrode is provided as a plurality of second via electrodes, and the plurality of second via electrodes have the same depths.

6. The MLCC of claim 1, wherein a portion of a top surface of the first internal electrode is exposed to the first via electrode, and a portion of a top surface of the second internal electrode is exposed to the second via electrode.

7. The MLCC of claim 1, wherein at least one of the inner insulating layers is arranged between one of the plurality of via electrodes and one of the first and second internal electrodes.

8. A multilayer ceramic capacitor (MLCC), comprising:
a ceramic body having a plurality of dielectric layers, a plurality of first internal electrodes, and a plurality of second internal electrodes, the plurality of first internal electrodes and the plurality of second internal electrodes being alternately disposed with at least one among the plurality of dielectric layers being interposed therebetween on a substrate;
an outer insulating layer including a side portion disposed on a side surface of the ceramic body to cover each of the first internal electrodes and each of the second internal electrodes, and an upper portion connecting the side portion and an uppermost one of the inner insulating layers to each other: and
a protective layer covering the side portion of the outer insulating layer and at least a portion of the upper portion of the outer insulating layer; and
a first external electrode and a second external electrode, disposed on an exterior of the ceramic body,
wherein a plurality of via electrodes are disposed in the ceramic body,
a first via electrode among the plurality of via electrodes connects the plurality of first internal electrodes to the first external electrode, and penetrates through the ceramic body from a surface of the ceramic body to the first internal electrode among the plurality of first internal electrodes disposed most adjacently to the substrate,
a second via electrode among the plurality of via electrodes connects the plurality of second internal electrodes to the second external electrode, and penetrates through the ceramic body from the surface of the ceramic body to the second internal electrode among the plurality of second internal electrodes disposed most adjacently to the substrate,
a top surface of at least one among the plurality of first internal electrodes is exposed to the first via electrode, and a top surface of at least one among the plurality of second internal electrodes is exposed to the second via electrode,
inner insulating layers respectively cover all side surfaces of the first and second via electrodes,
at least one of the inner insulating layers is in direct contact with a side surface of one of the first internal electrodes and one of the second internal electrodes adjacent to the one of the first internal electrodes,
the plurality of via electrodes have a stepped shape, and
the stepped shape of the plurality of via electrodes defines a shape of stacked cylinders, and, for each of the plurality of via electrodes, the respective stacked cylinders have the same center.

* * * * *